(12) United States Patent
Houdayer et al.

(10) Patent No.: US 8,851,227 B2
(45) Date of Patent: Oct. 7, 2014

(54) BEARING ASSEMBLY FOR A POWER STEERING MECHANISM

(75) Inventors: Christophe Houdayer, Semblancay (FR); Jacques Charpentier, Tours (FR); Benoit Arnault, St-Cyr-sur-Loire (FR); Yves Liverato, Saint-Paterne Racan (FR); Sylvain Bussit, Monnaie (FR); Carole Girardin, Charentilly (FR)

(73) Assignee: Aktiebolaget SKF, Gothenburg (SE)

( * ) Notice: Subject to any disclaimer, the term of this patent is extended or adjusted under 35 U.S.C. 154(b) by 362 days.

(21) Appl. No.: 13/144,637

(22) PCT Filed: Jan. 22, 2010

(86) PCT No.: PCT/US2010/000164
§ 371 (c)(1),
(2), (4) Date: Sep. 15, 2011

(87) PCT Pub. No.: WO2010/085346
PCT Pub. Date: Jul. 29, 2010

(65) Prior Publication Data
US 2012/0024618 A1    Feb. 2, 2012

Related U.S. Application Data

(60) Provisional application No. 61/205,865, filed on Jan. 23, 2009.

(51) Int. Cl.
*B62D 5/04* (2006.01)
*F16H 25/20* (2006.01)
*F16C 25/08* (2006.01)
*F16C 19/52* (2006.01)
*F16H 25/24* (2006.01)

(52) U.S. Cl.
CPC ............ *B62D 5/0448* (2013.01); *F16C 25/083* (2013.01); *F16C 19/522* (2013.01); *F16H 25/24* (2013.01)
USPC ........................... 180/444; 384/535; 384/581

(58) Field of Classification Search
USPC .......... 180/443, 444, 447; 384/500, 535, 536, 384/581, 582
See application file for complete search history.

(56) References Cited

U.S. PATENT DOCUMENTS

| | | | | |
|---|---|---|---|---|
| 1,152,681 | A | * | 9/1915 | Wieselgreen ................. 384/535 |
| 1,965,293 | A | * | 7/1934 | Ljungstrom ................. 384/535 |
| 2,357,597 | A | * | 9/1944 | Martinec ...................... 384/536 |
| 3,376,084 | A | * | 4/1968 | McKee ......................... 384/536 |

(Continued)

*Primary Examiner* — Anne Marie Boehler
*Assistant Examiner* — Maurice Williams
(74) *Attorney, Agent, or Firm* — Bryan Peckjian; SKF USA Inc. Patent Department

(57) ABSTRACT

A bearing assembly is for a mechanism including a housing and a rotatable shaft disposed within the housing. The bearing assembly includes a sleeve disposable within the housing and having an inner circumferential surface defining a bore and a radial surface extending radially inwardly from the inner surface. A bearing is disposed within the bore and includes inner and outer races and rolling elements disposed between the races, the inner race being coupleable with the shaft such that the shaft and the inner race rotate as a single unit. Further, a biasing member biases the outer race generally against the sleeve radial surface or a housing radial surface to prevent axial displacement of the outer race during shaft rotation. Preferably, a retainer couples the biasing member with the outer race to retain the bearing and the biasing member within the bore when the assembly is separate from the housing.

12 Claims, 10 Drawing Sheets

(56) References Cited

U.S. PATENT DOCUMENTS

| | | | |
|---|---|---|---|
| 3,604,545 A * | 9/1971 | Bourgeois | 192/98 |
| 4,555,190 A | 11/1985 | Lederman | |
| 4,666,014 A * | 5/1987 | Carlson et al. | 180/444 |
| 4,712,659 A | 12/1987 | Flotow | |
| 4,854,751 A * | 8/1989 | Grassmuck et al. | 384/537 |
| 4,900,165 A * | 2/1990 | Kun et al. | 384/220 |
| 5,590,968 A * | 1/1997 | Dretzka | 384/563 |
| 5,816,712 A * | 10/1998 | Brown et al. | 384/536 |
| 6,007,252 A * | 12/1999 | Thelen et al. | 384/535 |
| 6,030,128 A * | 2/2000 | Pontzer | 384/476 |
| 6,394,658 B1 | 5/2002 | Crowell | |
| 6,502,995 B1 | 1/2003 | Ozsoylu | |
| 6,971,802 B2 * | 12/2005 | Vezina | 384/517 |
| 7,219,761 B2 * | 5/2007 | Fukuda et al. | 180/444 |
| 7,520,675 B2 | 4/2009 | Ihata et al. | |
| 7,637,667 B1 * | 12/2009 | Schaub | 384/536 |
| 8,042,645 B2 * | 10/2011 | Kurokawa | 180/444 |
| 8,459,402 B2 * | 6/2013 | Hamakita et al. | 180/444 |
| 2002/0155009 A1 * | 10/2002 | Panos et al. | 417/407 |
| 2004/0149512 A1 * | 8/2004 | Tsutsui et al. | 180/443 |
| 2005/0135718 A1 | 6/2005 | Vezina | |
| 2005/0232525 A1 * | 10/2005 | Faust et al. | 384/535 |
| 2006/0191738 A1 * | 8/2006 | Eda et al. | 180/444 |
| 2006/0210206 A1 | 9/2006 | Ihata et al. | |
| 2007/0102228 A1 * | 5/2007 | Shiina et al. | 180/444 |
| 2009/0103846 A1 * | 4/2009 | Faust et al. | 384/535 |
| 2009/0294203 A1 * | 12/2009 | Okada et al. | 180/444 |

* cited by examiner

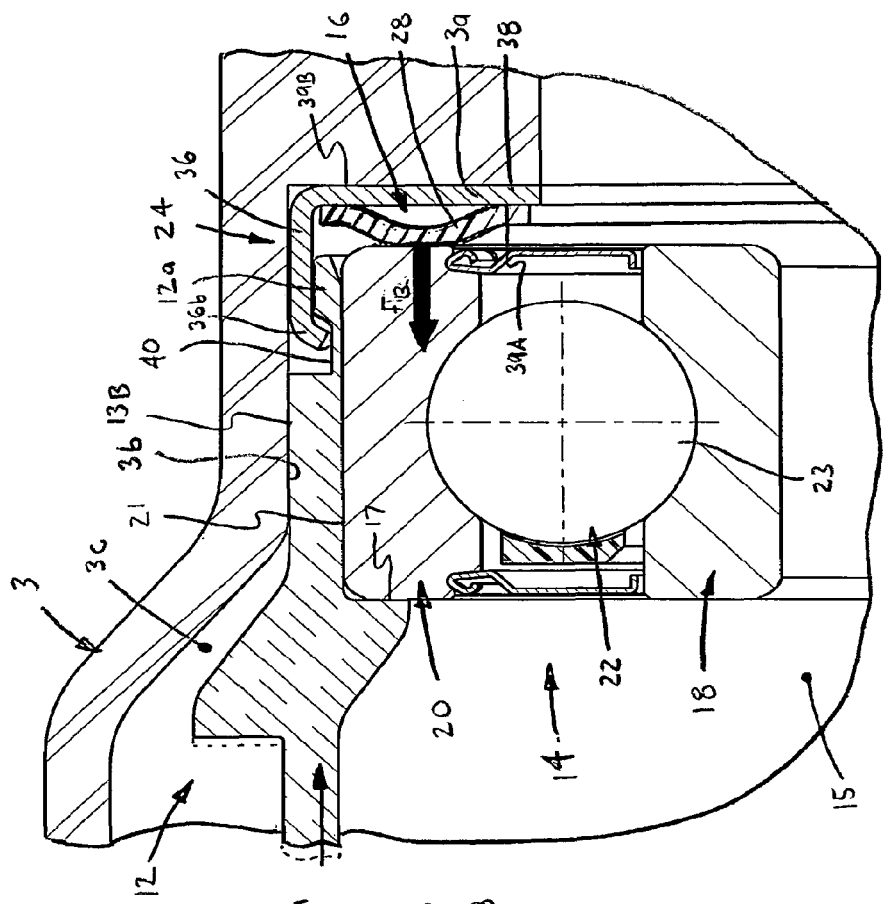
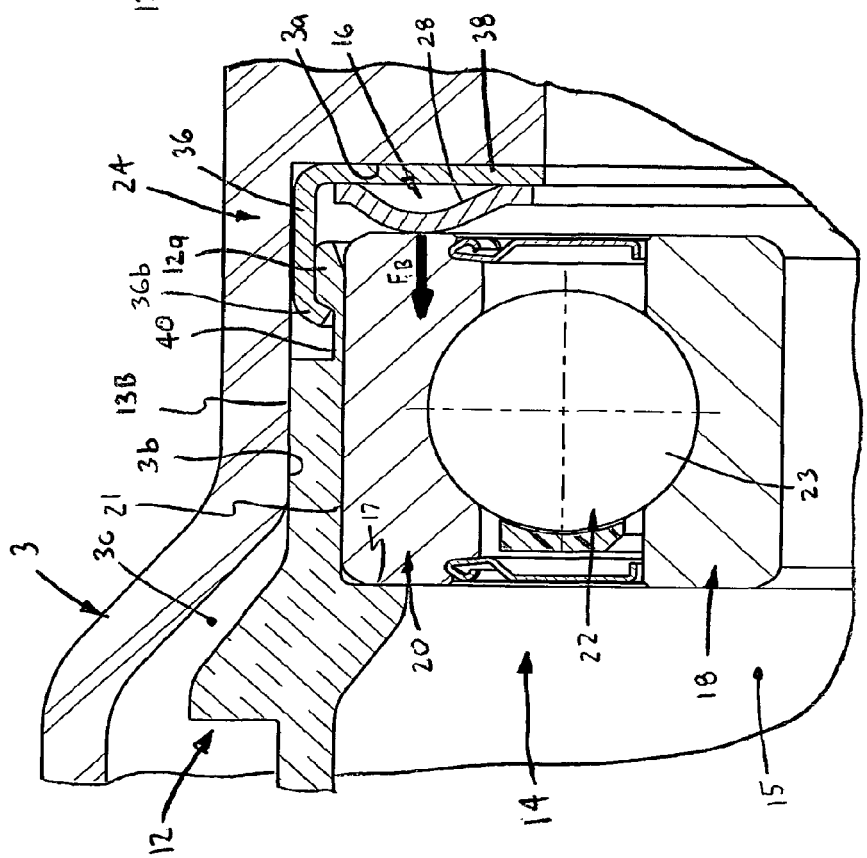

BEARING ASSEMBLY FOR A POWER STEERING MECHANISM

CROSS-REFERENCE

This application is the U.S. national stage of International Application No. PCT/US2010/000164 filed on Jan.22, 2010 which claims priority to U.S. Provisional Application No. 61/205,865 filed on Jan. 23, 2009.

The present invention relates to bearings, and more particularly to bearing assemblies for mechanisms such as steering actuators.

Bearing assemblies for mechanisms such as actuators, gear boxes, differentials, etc. are generally known and often include an inner race mounted on a shaft, an outer race mounted within a housing, and a plurality of rolling elements disposed between the inner and outer races. Typically, the inner race is fixedly mounted on the shaft by appropriate means (e.g., keys, clips, etc.) and the outer race is mounted directly within the housing, or within an intermediate element such as a sleeve that is itself mounted within the housing, etc., by means of an interference fit or "press fit".

In order to prevent excessive radial stresses on the bearing, the press-fit was formed with a minimum of interference between the mating surfaces (i.e., a light press fit). However, due to manufacturing variations within normal tolerance limits, a transition fit or even a clearance fit sometimes occurred in such bearing assemblies when the outer race outside diameter was at the lower tolerance limit and the housing inside diameter was at the upper end of the tolerance limit. As a result, the outer race could displace axially during shaft rotation, resulting in the generation of undesired noise (e.g., a "clicking" sound) during operation of the mechanism.

SUMMARY OF THE INVENTION

In one aspect, the present invention is a bearing assembly for a mechanism including a housing and a rotatable shaft disposed within the housing. The bearing assembly comprises a sleeve disposable within the housing and having an inner circumferential surface defining a bore and a radial surface extending radially inwardly with respect to the inner surface. A bearing is disposed within the sleeve bore and includes inner and outer races and a plurality of rolling elements disposed between the inner and outer races, the inner race being coupleable with the shaft such that the shaft and the inner race rotate as a single unit. Further, a biasing member is configured to bias the bearing outer race generally against one of the sleeve radial surface and a radial surface of the housing so as to substantially prevent axial displacement of the bearing outer race during rotation of the shaft.

In another aspect, the present invention is a power steering assembly comprising a screw linearly displaceable along a central axis and having at least one end connectable with steering device for turning a wheel. A drive nut is disposed about a section of the screw, is rotatable about the central axis, and is threadably engaged with the screw such that rotation of the nut displaces the screw along the axis. A housing has an interior chamber and a bearing assembly is configured to rotatably mount the drive nut within the housing chamber. The bearing assembly includes a sleeve disposable within the housing and having an inner circumferential surface defining a bore and a radial surface extending radially inwardly with respect to the inner surface. A bearing is disposed within the sleeve bore and includes inner and outer races and a plurality of rolling elements disposed between the inner and outer races, the inner race being coupled with the nut such that the nut and the inner race rotate as a single unit. Further, a biasing member configured to bias the bearing outer race generally against one of the sleeve radial surface and a radial surface of the housing so as to substantially prevent axial displacement of the bearing outer race during rotation of the nut.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 4A and 4B, collectively FIG. 4, are each a broken-away, enlarged view of a portion of FIG. 3, FIG. 4A showing the bearing assembly in a partly installed position and FIG. 4B showing the bearing assembly in a fully installed position;

DETAILED DESCRIPTION OF THE INVENTION

Figure 1:
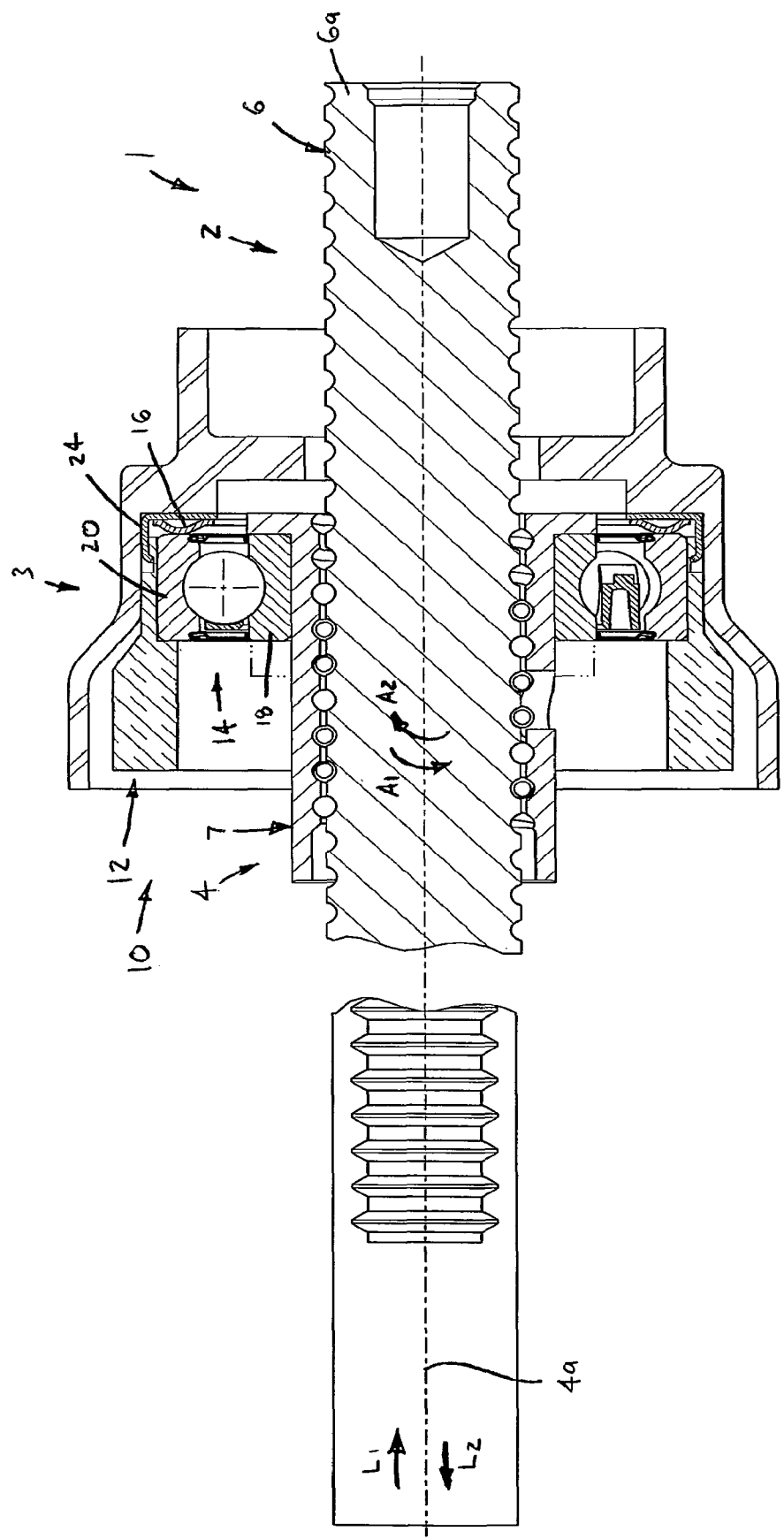
FIG. 1 is a partly broken-away, axial cross-sectional view through a ball screw actuator of a power steering mechanism, which incorporates a bearing assembly in accordance with the present invention.

Certain terminology is used in the following description for convenience only and is not limiting. For example, the word "connected" is intended to include direct connections between two members without any other members interposed therebetween and indirect connections between members in which one or more other members are interposed therebetween. The term "coupled" is intended to include direct or indirect connections, operative engagements and contacts, and operative connections without any direct attachment or contact of one or more elements. The terminology includes the words specifically mentioned herein, derivatives thereof, and words of similar import.

Referring now to the drawings in detail, wherein like numbers are used to indicate like elements throughout, there is shown in FIGS. 1-10 a bearing assembly 10 for a mechanism 1, preferably a power steering actuator 2 as described below, that includes a housing 3 and a rotatable shaft 4 disposed within the housing 3. The bearing assembly 10 basically comprises a sleeve 12 disposable within the housing 3, a bearing 14 disposed within the sleeve 12, and a biasing member 16. The sleeve 12 has an inner circumferential surface 13A defining a bore 15, an opposing outer circumferential surface 13B, and a radial surface 17 extending radially inwardly with respect to the inner surface 13A. The bearing 14 disposed within the sleeve bore 15 and includes inner and outer races 18, 20 and a plurality of rolling elements 22 disposed between the inner and outer races 18, 20. The inner race 18 is connectable with the shaft 4 such that the shaft 4 and the race 18 rotate as a single unit (i.e., no relative rotation between shaft 4 and race 18) about a central axis 4a. Further, the biasing member 16 is configured to bias the bearing outer race 20 generally against either the sleeve radial surface 17 (FIGS. 1-5, 7 and 8), or a radial surface 3a of the housing 3 (FIG. 9), so as to substantially prevent axial displacement of the bearing outer race 20 during rotation of the shaft 4.

Further, the bearing 14 is preferably formed such that the outer race 20 has an outer circumferential surface 21 sized to engage with the sleeve inner circumferential surface 13A so as to form either a clearance fit or a transition fit (i.e., a locational fit) between the race 20 and the sleeve 12. Thus, there is minimal or no radial stress applied to the bearing 14 through the sleeve 12, and vice-versa, which reduces friction inside the bearing 14 and leads to increased bearing life. Also, due to the fact that the axial position of the outer race 20 is established or maintained by the biasing member 16 pushing the race 20 axially against a radial surface 15 or 3a, as opposed to an interference fit (i.e., a "press" or friction fit) at the outer circumferential surface 21, tolerance stack-up of the bearing 14 in the radial direction is decreased. Further, the sleeve outer circumferential surface 13B is preferably sized to engage with an inner circumferential surface 3b of the housing so as to form an interference fit between the sleeve 12, which is preferably steel, and the housing 3, which is preferably aluminum.

Preferably, the bearing assembly 10 further comprises a retainer 24 configured to couple the biasing member 16 with the outer race 20, most preferably by maintaining contact engagement between the biasing member 16 and the outer race 20, and thus also between the race 20 and the sleeve surface 17 or housing surface 3a. As such, the bearing 18 and the biasing member 16 are retained within the sleeve bore 15 when the bearing assembly 10 is separate from the housing 3. Thus, the bearing assembly 10 may be supplied to a customer or user in the preassembled state shown in FIG. 6, and is readily installable within the housing 3 by merely axially displacing or sliding the sleeve 12 into a housing chamber or bore 3c defined by an inner circumferential surface 3b, as described in greater detail below.

In certain constructions as depicted in FIGS. 1-6, the retainer 24 is a separate component from the biasing member 16 and provides a base surface 39A against which the biasing member 16 "pushes" when concurrently exerting force on, or pushing against, the bearing outer race 20. However, in other constructions as shown in FIG. 8, the biasing member 16 and the retainer 24 are integrally formed, i.e., are of one-piece construction, as described in further detail below.

Figure 5:
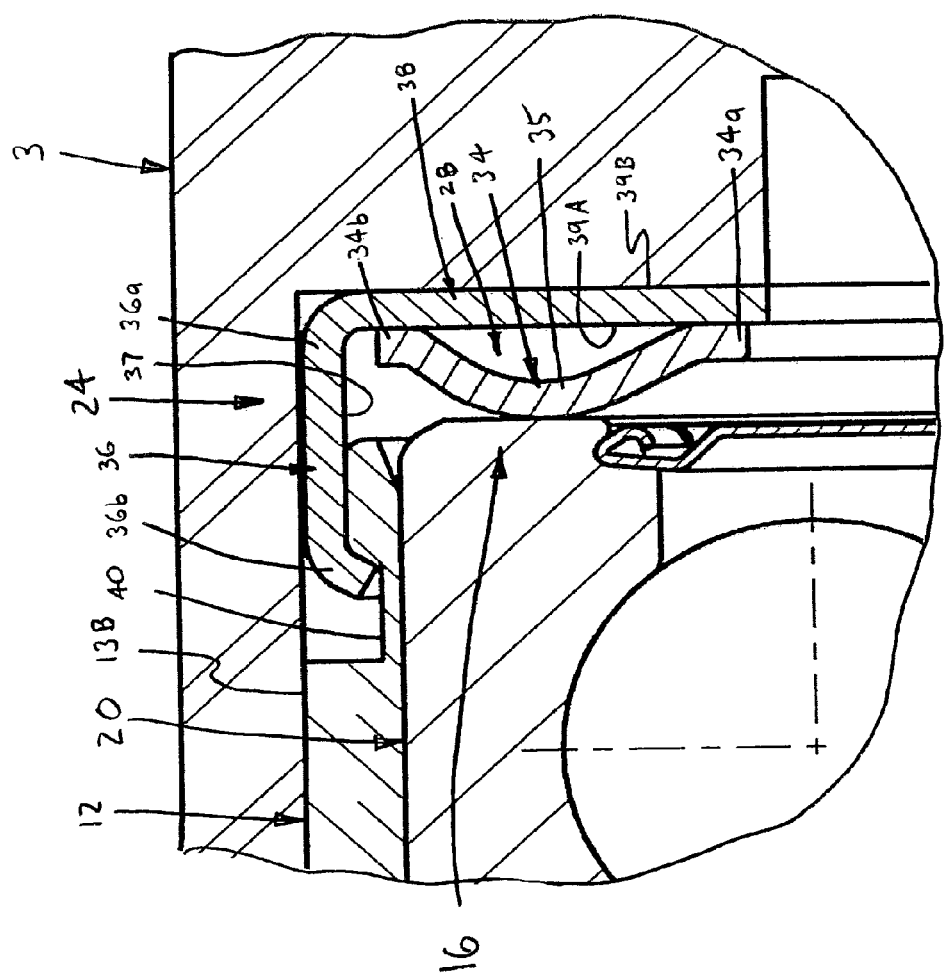
FIG. 5 is a broken-away, greatly enlarged axial cross-sectional of a portion of FIG. 3, showing a section of an outer race, a biasing member and a retainer.
Figure 7:
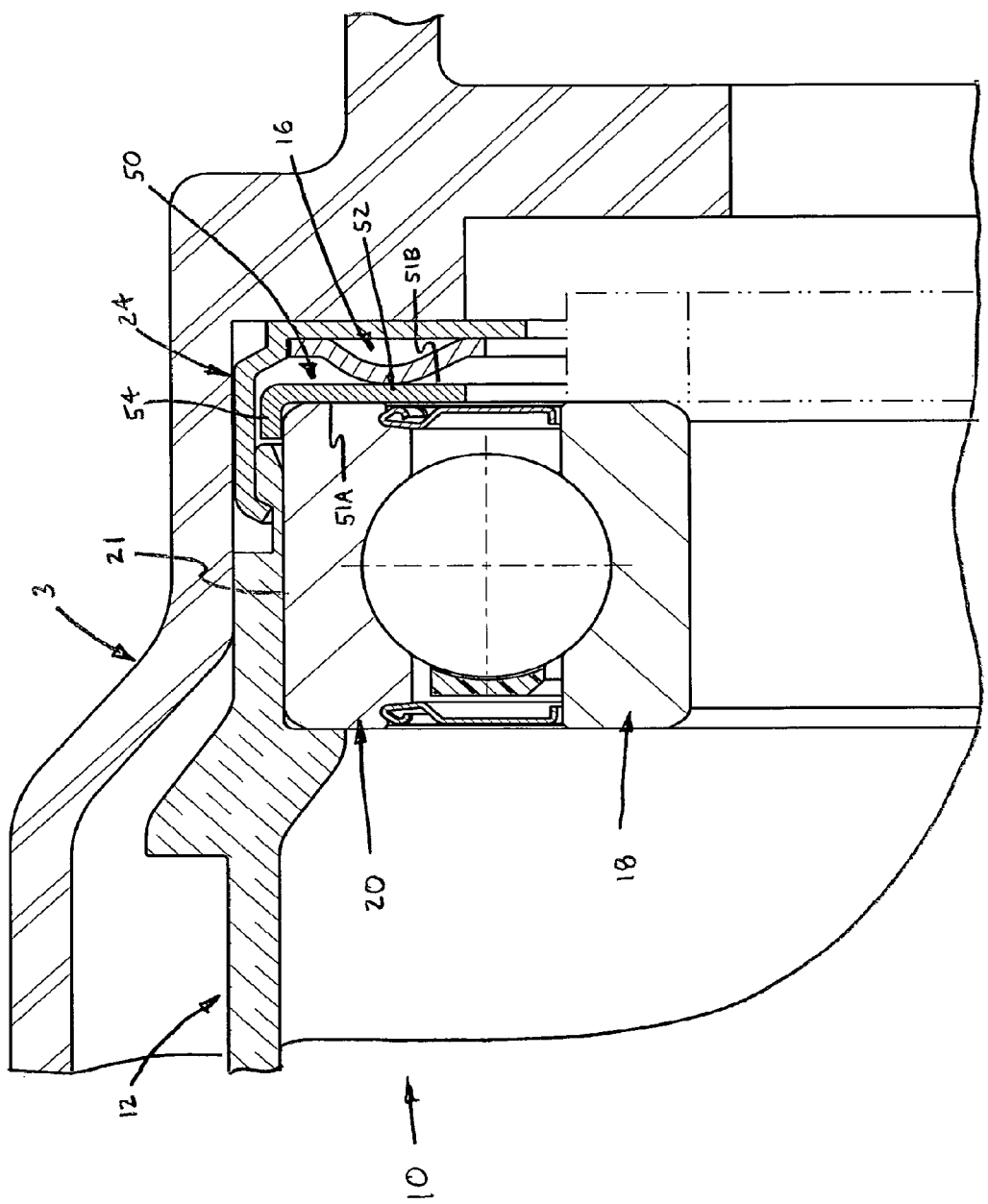
FIG. 7 is a partly broken-away, axial cross-sectional view of an upper portion of an alternative construction of the bearing assembly, including a transfer member.
Figure 8:
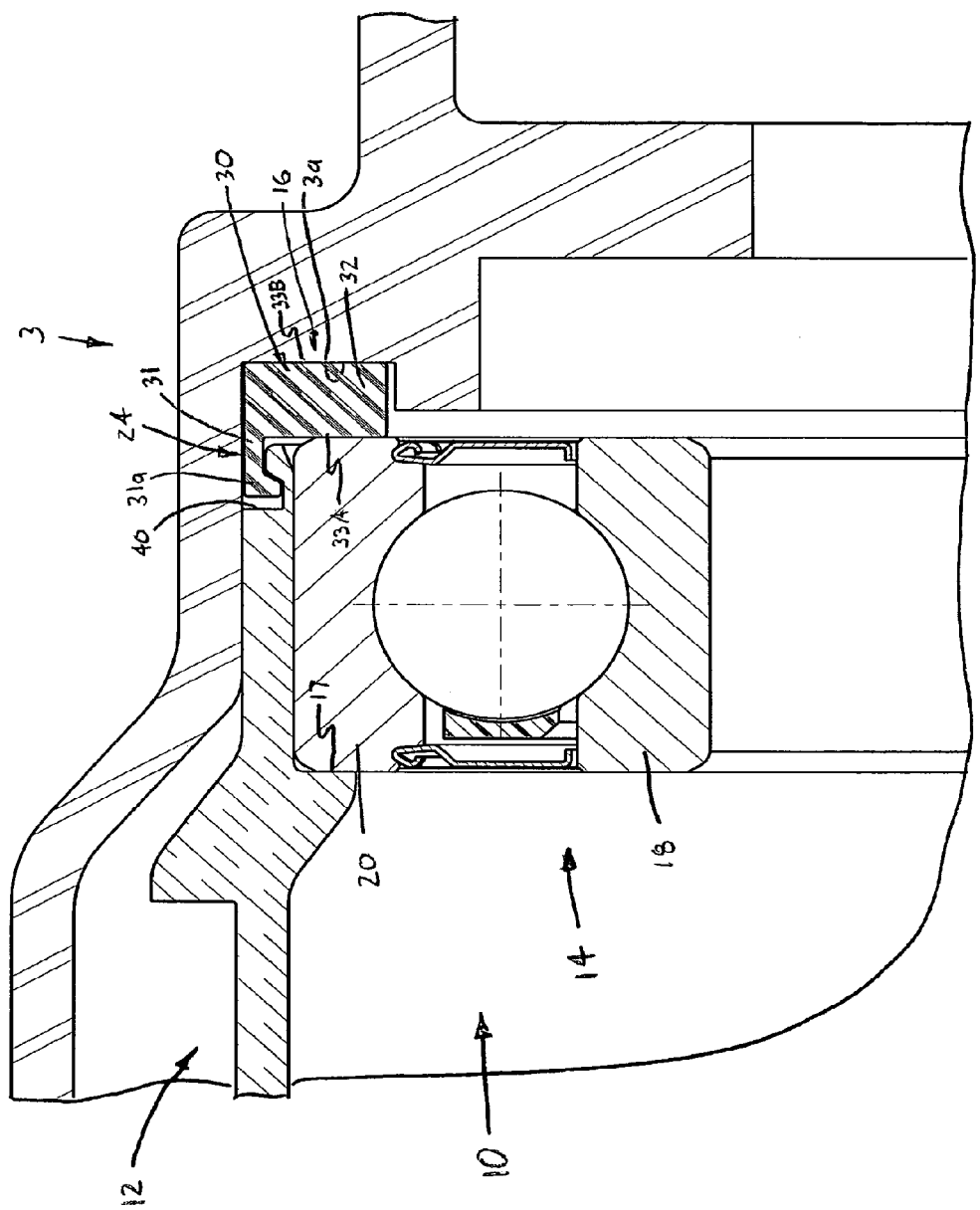
FIG. 8 is a partly broken-away, axial cross-sectional view of an upper portion of another alternative construction of the bearing assembly, including an integral biasing member and retainer.
Figure 9:
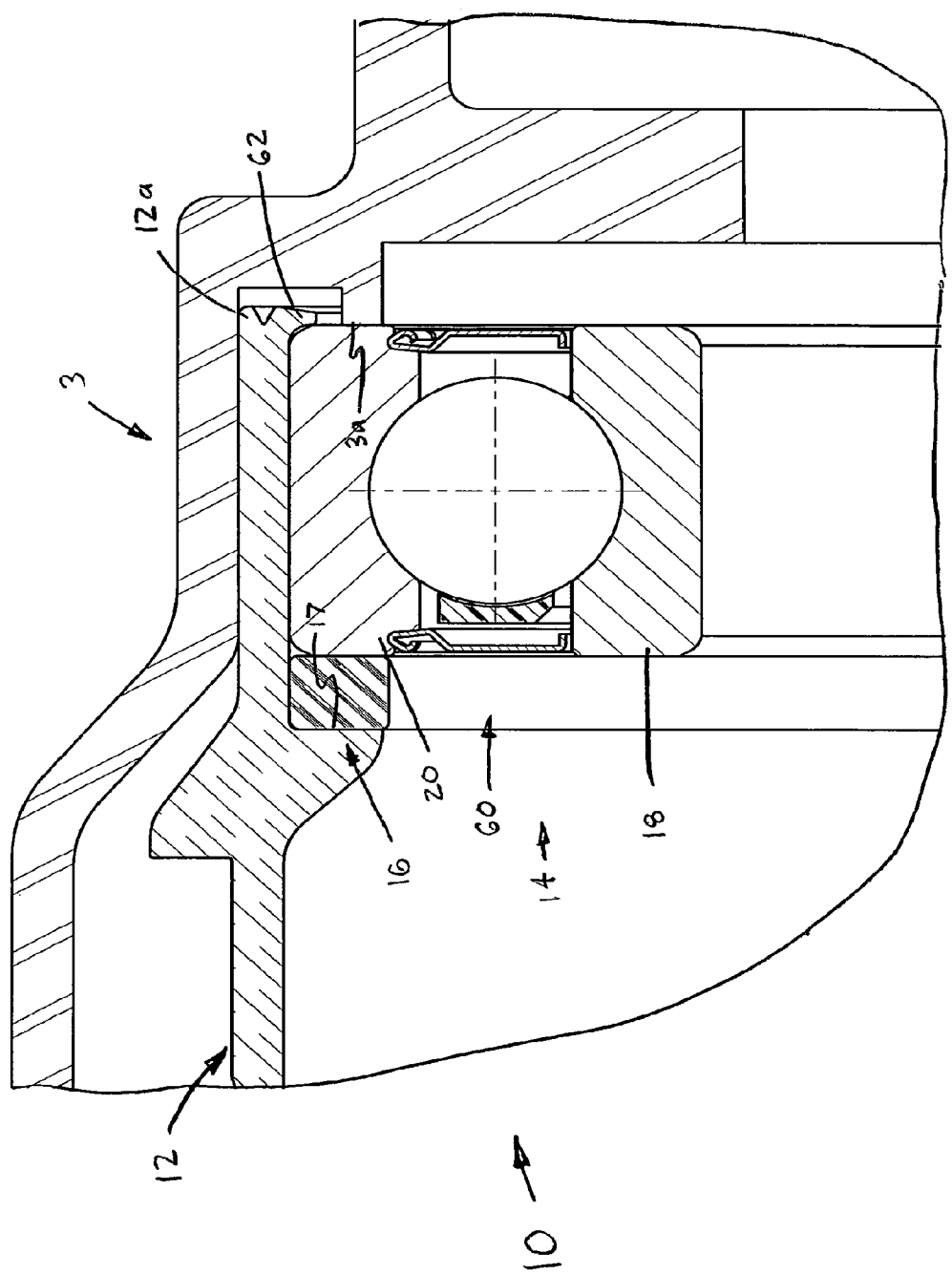
FIG. 9 is a partly broken-away, axial cross-sectional view of an upper portion of yet another alternative construction of the bearing assembly, having an elastomeric biasing member biasing the outer race against a housing surface.

Preferably, the biasing member 16 is either a spring washer 28 (FIGS. 1-7) or an elastomeric member 30 or 60 (or a portion thereof), as shown in FIGS. 8 and 9. When formed as or provided by a spring washer 28, the biasing member 16 is most preferably a spherical washer that includes a generally annular body 34 having inner and outer radial ends 34a, 34b and a central portion 35 extending axially with respect to the ends 34a, 34b, as best shown in FIG. 5. The central portion 35 is disposable against the bearing outer race 20 and is deflectable relative to the ends 34a, 34b so as to exert a force $F_B$ on the outer race 20, as indicated in FIG. 4. However, the spring washer 28 may alternatively be formed as a Belleville washer, a wave spring washer, or any other appropriate washer-like component disposable about the central axis and capable of exerting a force on an adjacent element when deflected or compressed. Further, when the biasing member 16 is provided by an elastomeric body 30 or 60, at least a portion of the body 30, 60 is compressed between the bearing outer race 20 and either the housing radial surface 3a (FIG. 8) or the sleeve radial surface 17 (FIG. 9). Thereby, the biasing member body 30, 60 exerts a force on the outer race 20 to retain the outer race 20 disposed against the sleeve radial surface 17 or the housing radial surface 3a.

Although the biasing member 16 is preferably a spring washer 28 or an annular elastomeric body 30 or 60, the biasing member may be formed in any other appropriate manner capable of biasing the bearing outer race as generally described herein. For example, the biasing member 16 may be provided by a single coil spring disposed about the shaft 4, a plurality of separate coil springs spaced circumferentially about the central axis 4a, etc.

Figure 6:
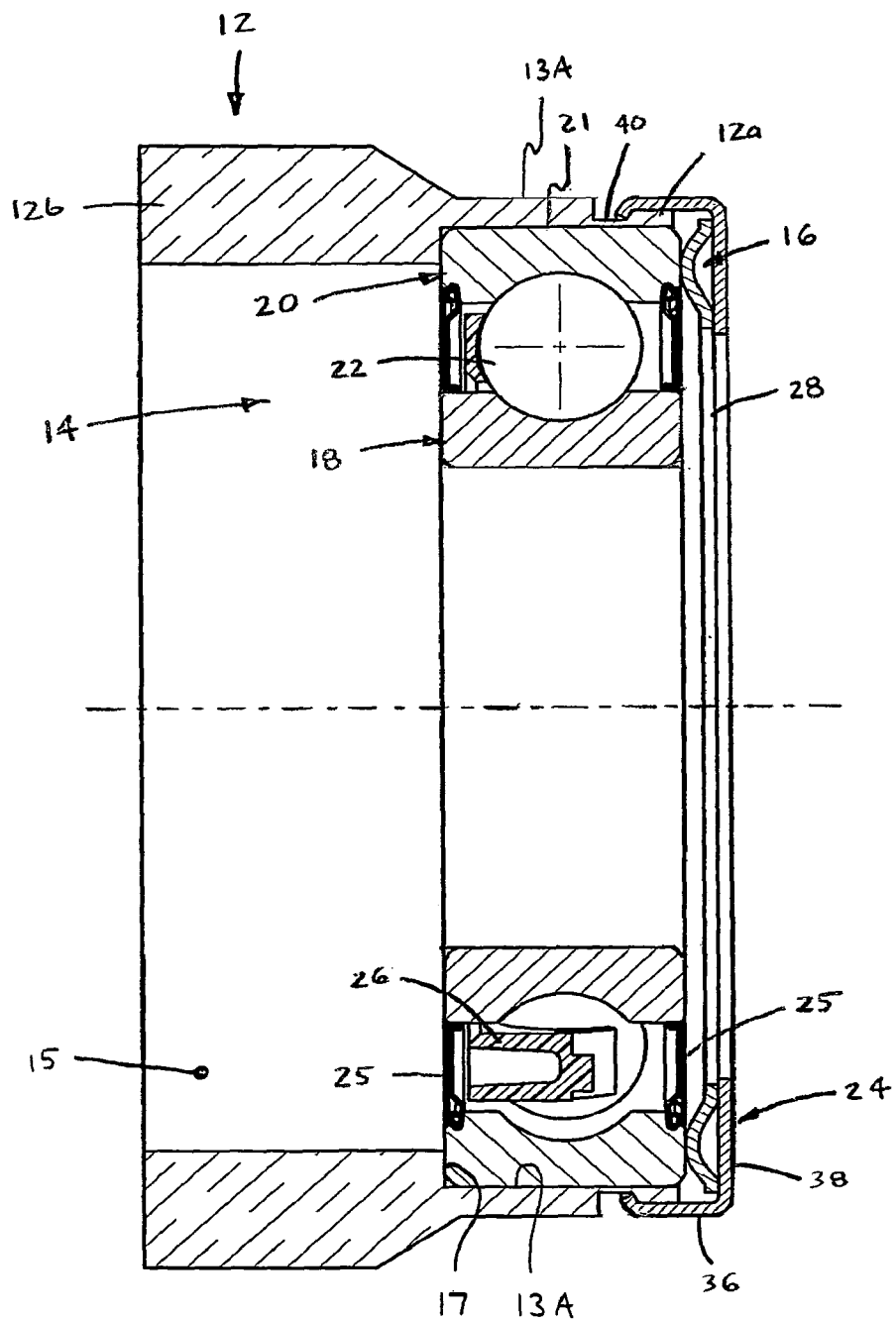
FIG. 6 is an axial cross-sectional view of the bearing assembly, shown uninstalled or separate from the mechanism.

Referring to FIGS. 1 and 6, the sleeve 12 is preferably generally annular or tubular and includes a first end 12a disposable within the housing bore 3c and a second end 12b engageable with a second housing (not shown). As discussed above, the sleeve 12 is preferably fabricated of a metallic material, such as for example, a low carbon steel. The bearing 14 is preferably a conventional ball bearing including generally annular inner and outer races 20, 22 and rolling elements 22 each formed as a ball 23. Most preferably, the ball bearing 14 is a "four-point contact" ball bearing having minimal axial clearance. Thus, by having a bearing 14 with minimal axial clearance and an outer race 20 that is substantially axially fixed or restrained by action of the biasing member and a fixed axial surface 17 or 3a, there is essentially no axial displacement of any of the bearing components, and thereby a reduction or elimination of undesirable noise generated by the bearing 14. Further, the bearing 14 preferably includes seals 25 and a cage 26 for retaining the balls 23. Although preferably a ball bearing, the bearing 14 may alternatively be a cylindrical roller bearing, a needle bearing, a tapered roller bearing or any other type of rolling element bearing or even another type of bearing (e.g., a plain or journal bearing).

Referring now to FIGS. 1-6, in a first preferred construction, the retainer 24 includes a generally annular body 34 with an axial portion 36 engaged with the sleeve 12 and a radial portion 38 having a first radial surface 39A disposed against the biasing member 16 and an opposing, second radial surface 39B disposable against a radial surface 3a of the housing 3. With this structure, the biasing member 16 is sandwiched or compressed between the retainer radial portion 38 and the bearing outer race 20, so as to thereby exert a force $F_B$ on the race 20. Preferably, the retainer axial portion 36 is formed as a generally annular band with an inner end 36a connected with the radial portion and an opposing free end 36b, and the radial portion 38 is formed as a generally annular washer extending radially inwardly from the axial portion 36. However, the retainer body 34 may be formed in any other appropriate manner that enables the retainer 34 to function as generally described herein.

Further, the axial portion 36 preferably has an inner circumferential surface 37 sized to fit about a section of the outer circumferential surface 13B of the sleeve 12, to thereby couple the retainer 24 with the sleeve 12. Most preferably, the sleeve 12 has an annular groove 40 extending generally radially inwardly from the sleeve outer surface 13B and the free end 36b of the retainer axial portion 36 is disposed within the groove 40, so as to thereby couple the retainer 24 with the sleeve 12. The groove 40 is preferably formed such that the axial portion end 36b is axially displaceable within the groove 40 to enable the retainer 24 to slidably displace relative to the sleeve 12. Specifically, by slidably engaging the retainer axial portion 36 with the sleeve 12, the retainer 24 is axially displaceable relative to the sleeve 12 to deflect the biasing member 16, which either applies or increases a biasing force $F_B$ on the bearing outer race 20 that is directed at least generally toward the sleeve radial surface 17.

Referring to FIGS. 1-6, with the above-described structure, the bearing assembly 10 is basically installed within the housing 3 in the following manner. The bearing assembly 10 is preferably provided in the "self supporting" preassembled state as depicted in FIG. 6. The assembly 10 is inserted through the housing opening 3d so that the sleeve outer surface 13B engages with the housing inner surface 3b and is displaced axially until the retainer radial portion 38 becomes disposed against the housing radial surface 3a, as depicted in FIG. 4A. Thereafter, any further axial movement of the sleeve 12 towards the housing surface causes relative displacement between the sleeve 12 and the retainer axial portion 36 and deflection of the biasing member 16, thereby increasing the force F applied on the bearing outer race 20, as indicated in FIG. 4B. Such axial movement of the sleeve 12 relative to the retainer 24 may be used to establish a particular preload on the outer race 20, i.e., by adjusting the relative displacement of the sleeve 12 to vary the amount or extent of deflection of the biasing member 16. In certain applications in which the sleeve outer end 12b is connected with a second housing (not shown) as discussed above, the assembly of this second housing onto the sleeve 12 may be used to establish a desired preload on the bearing race 20.

Referring now to FIG. 7, in an alternative construction, the bearing assembly 10 further comprises a transfer member 50 disposed between the biasing member 16 and the outer race 20. As such, the biasing member 16 exerts force on the transfer member 50 to bias the bearing outer race 20 against the sleeve radial surface 17. By having the transfer member 50, the biasing member 16 is presented with a radially-larger surface area against which to apply force and enables contact with the bearing outer race 20 at radial positions which may otherwise interfere with other bearing components, such as the seals 25, as depicted in FIG. 7. Preferably, the transfer member 50 includes a generally annular or washer-like plate 52 disposed having a first radial surface 51A disposed against the bearing 14 and an opposing second surface 51B contactable by the biasing member 16. Further, the transfer member 50 also preferably includes a mounting shoulder 54 extending generally axially from the plate 52 and disposable about a portion of the outer race outer surface 21 so as to position the transfer member 50 on the bearing 14. Otherwise, the construction of the bearing assembly 10 shown in FIG. 6 is substantially similar to the preferred construction of FIGS. 1-5.

Referring particularly to FIG. 8, in another alternative construction, the biasing member 16 and retainer 24 are integrally formed, as mentioned above, such that the biasing member 16 is directly coupled with the sleeve 12 and is further configured to retain the bearing 14 within the sleeve bore 15. Specifically, the biasing member 16 includes an elastomeric body 30 with an axial portion 31 engaged with the sleeve 12 and a radial portion 32 having a first radial surface 33A disposed against the outer race 20 and an opposing, second radial surface 33B disposable against a radial surface 3a of the housing 3. The body radial portion 32 is compressible between the outer race 20 and the housing radial surface 3a so as to exert a force on the outer race 20 that is directed generally toward the sleeve radial surface 17. Further, the axial portion 31 has an inner end 31a connected with the radial portion 33 and an opposing, free end 31b that is disposed within the groove 40 of the sleeve 12, to thereby slidably couple the body 30 with the sleeve 12.

Referring now to FIG. 9, in yet another alternative construction, the biasing member 16 is formed as generally washer-like elastomeric body 60 disposed between the sleeve radial surface 17 and the bearing outer race 20. The elastomeric body 60 is compressed when the bearing assembly 10 is disposed within the housing 3 such that the biasing member 16 exerts a force on the outer race 20 to retain the race 20 disposed against the housing radial surface 3a, thereby preventing axial displacement of the outer race 20. With such a biasing member 16, the sleeve 12 preferably has retainer shoulder 62 extending radially-inwardly at the inner end 12a, the shoulder 62 being configured to retain the bearing 14 within the sleeve bore 15 when the bearing assembly 10 is separate from the housing 3.

Figure 2:
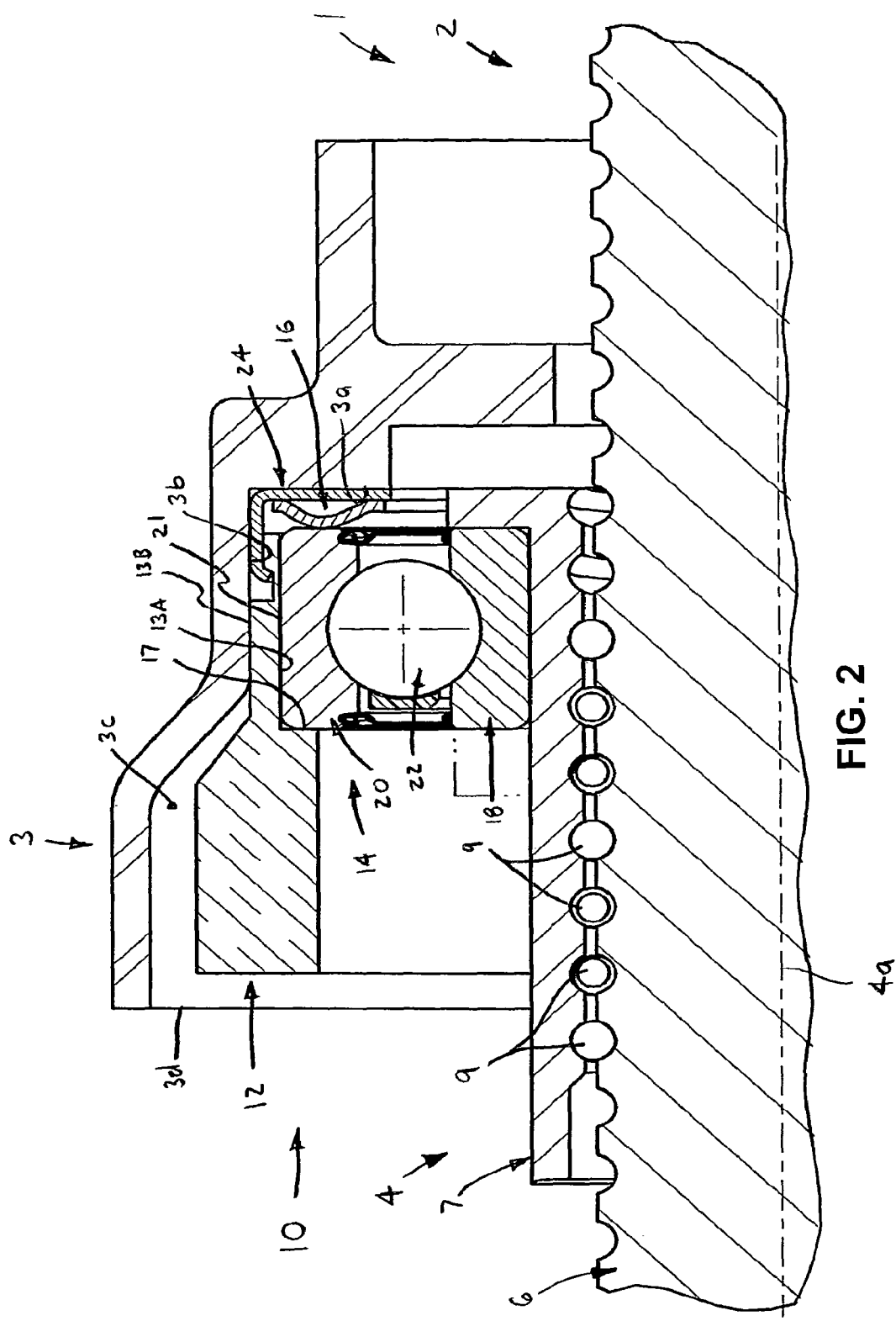
FIG. 2 is an enlarged, broken-away view of an upper portion of the ball screw actuator of FIG. 1.
Figure 3:
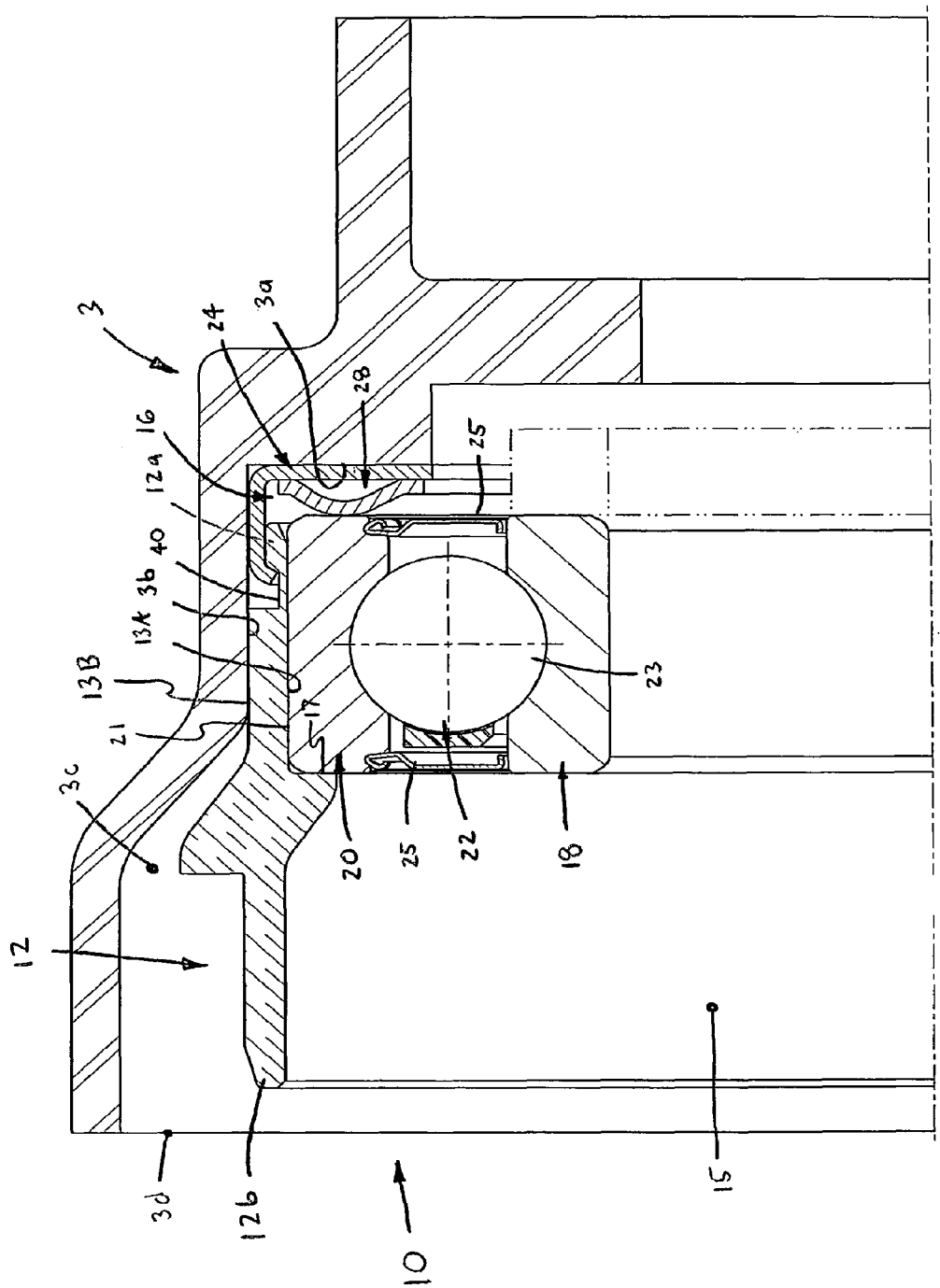
FIG. 3 is a broken-away, axial cross-sectional view of the bearing assembly shown mounted within a housing.
Figure 10:
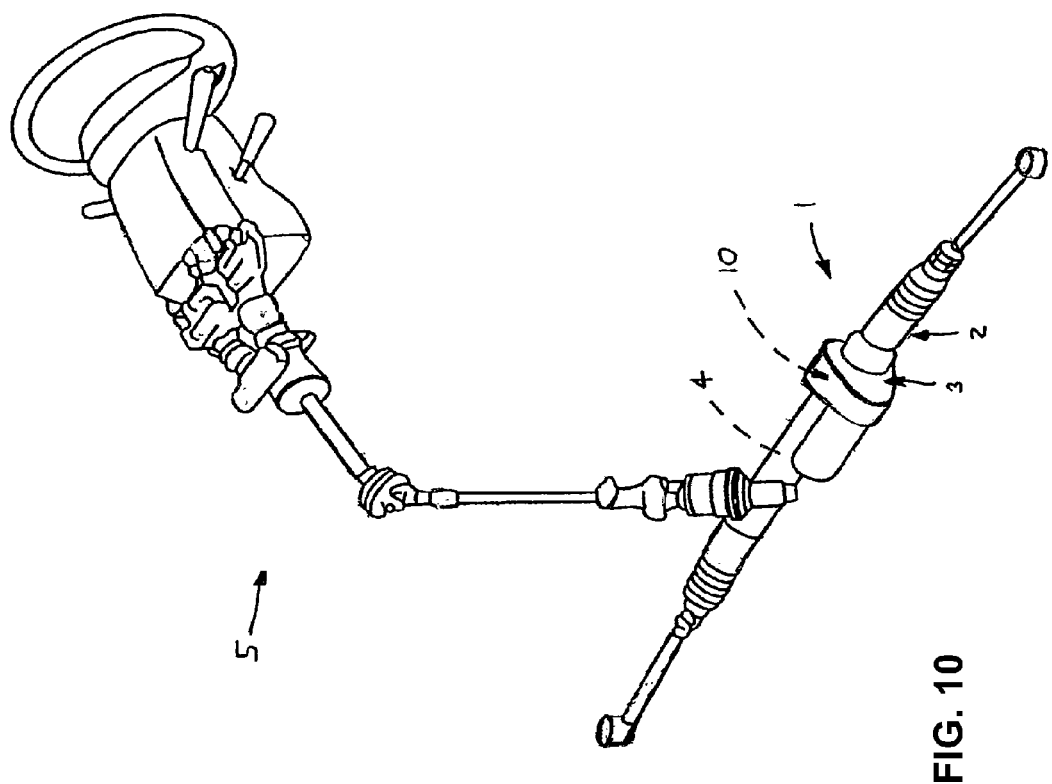
FIG. 10 is a perspective view of an exemplary power steering system including the bearing assembly of the present invention.

As depicted in FIGS. 1, 2 and 10, in a presently preferred application of the bearing assembly 10, the mechanism 1 is a power screw actuator 2 for a vehicle power steering system 5 that includes a screw 6 and a drive nut 7, and is most preferably "ball screw" actuator of an electric power steering system 5. The screw 6 is linearly displaceable along the central axis 4a and has at least one end 6a connectable with steering device for turning a wheel (neither shown). The mechanism shaft 4 is preferably a drive nut 7 disposed about a section of the screw 6 and is rotatable about the central axis 4a. The nut 7 is threadably engaged with the screw 6, preferably through a plurality of balls 9 but may alternatively be directly threadably engaged or engaged by means of intermediate rollers. In any of these cases, rotation of the nut 7 linearly displaces the screw 6 along the axis 4a, the nut 7 being rotatable in opposing angular directions $A_1$, $A_2$ to displace the screw 6 in opposing linear directions $L_1$, $L_2$, and thus turn the wheel(s) (none shown) in opposite directions (i.e., left or right turns).

As described above, the housing 3 has an interior chamber or bore 3c, which in this application houses or contains the nut 7 and a section(s) of the screw 6, and the bearing assembly 10 is configured to rotatably mount the drive nut 7 within the housing bore 3c. Specifically, all the basic elements of the bearing assembly 10 are formed as described above, with the bearing inner race 20 being mounted on the drive nut 7 such that the inner race 18 and the nut 7 rotate as a single unit. In this application, the biasing member 16 biases the outer race 20 against the relatively static sleeve surface 17 (or in certain constructions, the housing surface 3a) to prevent axial displacement of the outer race 20 during rotation of the nut 7 that may otherwise occur. Thus, the bearing assembly 10 eliminates a potential source of undesirable noise present in prior art bearing assemblies used in power steering actuators, while simultaneously reducing bearing radial stresses that could otherwise lead to premature bearing failure.

Although a presently preferred application of the bearing assembly 10 is a power screw actuator 2 for an electric power steering system 5, it is within the scope of the present invention to use the bearing assembly 10 in any other appropriate mechanism 1. For example, the bearing assembly 10 may be incorporated into a gear box, a differential, or any other mechanism 1 that includes a shaft 4 rotatably supported within a housing 3.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A bearing assembly for a mechanism including a housing and a rotatable shaft disposed within the housing, the bearing assembly comprising:
    a sleeve disposeable within the housing and having an inner circumferential surface defining a bore and a radial surface extending radially inwardly with respect to the inner surface;
    a bearing disposed within the sleeve bore and including inner and outer races and a plurality of rolling elements disposed between the inner and outer races, the inner race being coupleable with the shaft such that the shaft and the inner race rotate as a single unit;
    a biasing member configured to bias the bearing outer race generally against one of the sleeve radial surface and a radial surface of the housing so as to substantially prevent axial displacement of the bearing outer race during rotation of the shaft;
    and a retainer configured to couple the biasing member with the outer race such that the bearing and the biasing member are retained within the sleeve bore when the bearing assembly is separate from the housing, wherein the retainer includes a generally annular body with an axial portion engaged with the sleeve and a radial portion having a first radial surface disposed against the biasing member and an opposing, second radial surface disposeable against a radial surface of the housing, the biasing member being sandwiched between the retainer radial portion and the bearing outer race.

2. The bearing assembly as recited in claim 1 wherein:
    the outer race has an outer circumferential surface sized to engage with the sleeve inner circumferential surface so as to form one of a clearance fit and a transition fit;
    and the sleeve has an outer circumferential surface sized to engage with an inner circumferential surface of the housing so as to form an interference fit.

3. The bearing assembly as recited in claim 1 wherein the biasing member is one of a spring washer and an elastomeric member.

4. The bearing assembly as recited in claim 3 wherein the spring washer is one of a spherical washer, a Belleville washer, and a wave spring washer.

5. The bearing assembly as recited in claim 1 wherein the biasing member includes a generally annular body having inner and outer radial ends and a central portion extending axially with respect to the ends, the central portion being disposeable against the bearing outer race and deflectable relative to the radial ends so as to exert a force on the outer race.

6. The bearing assembly as recited in claim 1 wherein the retainer axial portion is generally annular and has an inner circumferential surface sized to fit about the outer circumferential surface of the sleeve so as to couple the retainer with the sleeve.

7. The bearing assembly as recited in claim 1 wherein the retainer axial portion is slidably engaged with the sleeve such that the retainer is displaceable relative to the sleeve to deflect the biasing member such that the biasing member exerts a force on the bearing outer race directed at least generally toward the sleeve retainer surface.

8. The bearing assembly as recited in claim 1 wherein the sleeve has an annular groove extending generally radially inwardly from the sleeve outer surface and the retainer axial portion has an inner end connected with the radial portion and an opposing, outer end disposed within the groove so as to couple the retainer with the sleeve.

9. The bearing assembly as recited in claim 1 wherein the biasing member is coupled with the sleeve and is further configured to retain the bearing within the sleeve when the bearing assembly is separate from the housing.

10. The bearing assembly as recited in claim 1 further comprising a transfer member disposed between the biasing member and the outer race, the biasing member exerting force on the transfer member so as to bias the bearing outer race against the sleeve radial surface.

11. A power steering assembly comprising:
    a screw linearly displaceable along a central axis and having at least one end connectable with steering device for turning a wheel;
    a drive nut disposed about a section of the screw, rotatable about the central axis, and threadably engaged with the screw such that rotation of the nut displaces the screw along the axis;
    a housing having an interior chamber;
    and a bearing assembly configured to rotatably mount the drive nut within the housing chamber, the bearing assembly including:
        a sleeve disposeable within the housing and having an inner circumferential surface defining a bore and a radial surface extending radially inwardly with respect to the inner surface;
        a bearing disposed within the sleeve bore and including inner and outer races and a plurality of rolling elements disposed between the inner and outer races, the inner race being coupled with the nut such that the nut and the inner race rotates as a single unit;
        a biasing member configured to bias the bearing outer race generally against one of the sleeve radial surface and a radial surface of the housing so as to substantially prevent axial displacement of the bearing outer race during rotation of the nut,
        and a retainer configured to couple the biasing member with the outer race such that the bearing and the biasing member are retained within the sleeve bore when the bearing assembly is separate from the housing, wherein the retainer includes a generally annular body with an axial portion engaged with the sleeve and a radial portion having a first radial surface disposed against the biasing member and an opposing, second radial surface disposeable against a radial surface of the housing, the biasing member being sandwiched between the retainer radial portion and the bearing outer race.

12. The bearing assembly as recited in claim 11 wherein:
    the outer race has an outer circumferential surface sized to engage with the sleeve inner circumferential surface so as to form one of a clearance fit and a transition fit between the outer race and the sleeve;
    and the sleeve has an outer circumferential surface sized to engage with an inner circumferential surface of the housing so as to form an interference fit between the sleeve and the housing.

* * * * *